(12) United States Patent  
Wang

(10) Patent No.: US 8,270,467 B1  
(45) Date of Patent: Sep. 18, 2012

(54) ENCODING IMAGE DATA

(75) Inventor: Yi Wang, Shanghai (CN)

(73) Assignee: Marvell International Ltd. (BM)

( * ) Notice: Subject to any disclaimer, the term of this patent is extended or adjusted under 35 U.S.C. 154(b) by 562 days.

(21) Appl. No.: 12/425,638

(22) Filed: Apr. 17, 2009

Related U.S. Application Data

(60) Provisional application No. 61/052,799, filed on May 13, 2008, provisional application No. 61/052,805, filed on May 13, 2008.

(51) Int. Cl.
- *H04N 7/12* (2006.01)
- *H04N 11/02* (2006.01)
- *H04N 11/04* (2006.01)

(52) U.S. Cl. ............... 375/240; 375/240.16; 375/240.12; 375/240.03

(58) Field of Classification Search ............... 375/240  
See application file for complete search history.

(56) References Cited

U.S. PATENT DOCUMENTS

| | | | |
|---|---|---|---|
| 7,010,035 B2 | 3/2006 | Shen et al. | |
| 7,236,524 B2 | 6/2007 | Sun et al. | |
| 7,289,562 B2 | 10/2007 | Yan et al. | |
| 7,289,674 B2 | 10/2007 | Karczewicz | |
| 7,310,377 B2 | 12/2007 | Wang et al. | |
| 7,386,048 B2 | 6/2008 | Sun et al. | |
| 2003/0202603 A1* | 10/2003 | Chen et al. | 375/240.25 |
| 2006/0039470 A1* | 2/2006 | Kim et al. | 375/240.16 |
| 2006/0285594 A1* | 12/2006 | Kim et al. | 375/240.16 |
| 2007/0237226 A1* | 10/2007 | Regunathan et al. | 375/240.12 |
| 2008/0031347 A1 | 2/2008 | Segall | |
| 2009/0046778 A1* | 2/2009 | Lee et al. | 375/240.03 |

OTHER PUBLICATIONS

Chun-Ling Yang, Lai-Man Po, Wing-Hong Lam, "A Fast H.264 Intra Prediction Algorithm Using Macroblock Properties", 2004 International Conference on Image Processing (ICIP).*

Xu He, Pengyu Liu, Kebin Jia and Yanhua Zhang, "A Fast Intra-frame Prediction Algorithm Based on the Characteristic of Macro-block and 2D-histogram for H.264/AVC Standard", Intelligent Information Hiding and Multimedia Signal Processing, 2007. IIHMSP 2007. Third International Conference on, vol. 1.*

Fast Intra- and Inter-Prediction Mode Decision in H.264 Advanced Video Coding, authored by Mendi Jafair and Shohreh Kasaei, IJCSNS International Journal of Computer Science and Network Security, vol. 8 No. 5, pp. 130-140, May 2008.

* cited by examiner

*Primary Examiner* — Sath V Perungavoor  
*Assistant Examiner* — Xiaolan Xu

(57) ABSTRACT

Devices, systems, methods, and other embodiments associated with encoding image data are described. In one embodiment, an apparatus comprises classification logic to determine, using an image characteristic from a macro-block of image data, whether the macro-block is a smooth image or a complex image based at least in part on the image characteristic. The apparatus may then generate an encoded macro-block by selectively encoding the macro-block using a first prediction mode if the macro-block is the smooth image and encoding the macro-block using a different second prediction mode if the macro-block is the complex image.

17 Claims, 8 Drawing Sheets

ENCODING IMAGE DATA

CROSS REFERENCE TO RELATED APPLICATIONS

This application claims the benefit of U.S. provisional application Ser. No. 61/052,799 filed on May 13, 2008 and U.S. provisional application Ser. No. 61/052,805 filed on May 13, 2008 the contents of which are both incorporated herein in their entirety.

BACKGROUND

Video compression is used in a variety of current and emerging products. Video compression is used in digital television set-top boxes, digital satellite systems, high definition television (HDTV) decoders, digital versatile disk (DVD) players, video conferencing, and other digital video applications. Video compression allows images of video content to be compressed by removing non-essential features of the video content. Compressing video content reduces the storage area needed to store the content. Compressed video content may be transmitted faster than un-compressed video content.

There are a variety of video coding methods that compress digital video content. Video coding standards have been developed to standardize the various video coding methods so that the compressed digital video content is rendered in formats that video encoders and decoders can recognize. For example, the International Telecommunication Union (ITU) in cooperation with the International Standards Organization (ISO) has developed the MPEG-4 Advanced Video Coding (AVC)/H.264 standard. There are multiple manipulations of video content when compressing the video content with the H.264 standard. For example, the H.264 standard will operate on portions of an image known as macroblocks (H.264 MBs). Each H.264 MB may be a 16×16 array of pixels. In intra frame encoding, the H.264 MBs are encoded using either an intra4 mode of encoding or an intra16 mode of encoding.

Cost values are determined for the intra4 and the intra16 modes of encoding to determine which intra mode will be used. The cost values indicate how well a specific H.264 MB will be represented by one of the intra4 or intra16 modes. Nine cost values need to be determined for nine intra4 modes. The nine intra4 modes are comprised of eight cost values associated with encoding an H.264 MB in one of eight directions. The ninth intra4 mode uses an average of pixel values to approximate the other pixel values and is not associated with a direction. Four cost values are determined for four intra16 modes. The intra mode with the smallest cost value is selected for encoding the H.264 MB after these thirteen cost values are determined. Calculating nine intra4 and four intra16 cost values is computationally expensive. A more effective way of encoding image data may be desired.

SUMMARY

In one embodiment, an apparatus comprises a classification logic that determines, using an image characteristic from a macro-block of image data, whether the macro-block is a smooth image or a complex image based at least in part on the image characteristic. Encoding logic is configured to generate an encoded macro-block by selectively encoding the macro-block using a first prediction mode if the macro-block is the smooth image and encoding the macro-block using a different second prediction mode if the macro-block is the complex image.

Another example embodiment includes an apparatus comprised of a threshold logic to determine a threshold value. The threshold value is based on a quantization parameter (QP) of a macroblock of image data. The apparatus is implemented with parameter logic to calculate an image characteristic based on pixel values of the macro-block. The apparatus is further implemented with classification logic and encoding logic. The classification logic assigns a classification value to the macro-block based on comparing the threshold value to the image characteristic. The encoding logic selectively encodes the macro-block based on the classification value. The encoding logic will encode the macro-block based on an intra16 prediction mode upon determining the classification value is smooth. The encoding logic will encode the macro-block based on an intra4 prediction mode upon determining the classification value is complex.

Another example embodiment includes a method. The method determines a smooth threshold and a complex threshold of an H.264 macroblock (H.264 MB) of image data. An image characteristic is calculated based on pixel values of the H.264 MB. The method assigns a classification value to the H.264 MB. The classification value is determined by comparing the image characteristic to the smooth threshold and the complex threshold. The method selectively encodes the H.264 MB based on the classification value. When it is determined the classification value is smooth, the H.264 MB is encoded based on an intra16 prediction mode. When it is determined the classification value is complex, the H.264 MB is encoded based on an intra4 prediction mode. When it is determined the classification value is medium, the method determines a medium threshold of the H.264 MB. When the classification value is smooth, an intra16 search of the H.264 MB is performed to determine a cost value. The H.264 MB is encoded based on an intra16 prediction mode upon determining the cost value is below or equal to the medium threshold.

Another example embodiment includes a method. Initially, a first cost is determined based on an H.264 intra4 first prediction mode of an H.264 macroblock (H.264 MB) of image data. Next a second cost is determined based on an H.264 intra4 second prediction mode of the H.264 MB. When the first cost is determined to be less than the second cost, a third cost is determined based on an H.264 intra4 third prediction mode of the H.264 MB. When the third cost is less than the first cost, a fourth cost is determined based on an H.264 intra4 fourth prediction mode of the H.264 MB. When the third cost is less than or equal to the fourth cost, the H.264 MB intra4 third prediction mode is assigned to the H.264 MB.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1A:
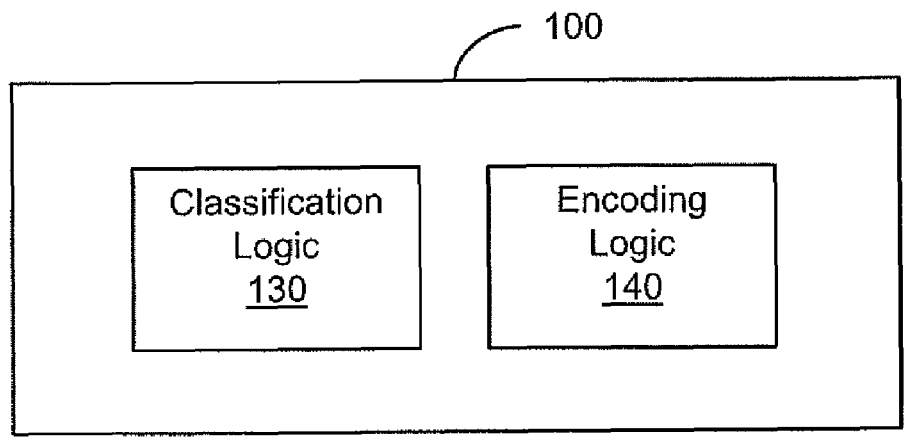
FIG. 1A illustrates one embodiment of an apparatus associated with encoding image data.

Described herein are example systems, methods, and other embodiments associated with encoding image data. H.264 macroblocks (H.264 MBs) may be classified as either smooth or complex. A smooth H.264 MB has pixel values that may not significantly change between adjacent pixels. For example, an H.264 MB representing a portion of a blue sky may be classified as smooth. A complex H.264 MB may have pixel values that change significantly between adjacent pixels representing a complex image. Complex H.264 MBs may have many image details. For example, an H.264 MB representing a portion of an iris of an eye may be classified as complex.

The intra4 mode of encoding is better suited to encode a complex H.264 MB than an intra16 mode of encoding. Smooth H.264 MBs are best encoded with an intra16 mode of encoding rather than an intra4 mode of encoding. Information may be extracted from an H.264 MB to determine whether the H.264 MB is smooth or complex. The intra4 cost values do not need to be determined when the H.264 MB is determined to be smooth. The intra16 cost values do not need to be determined when the H.264 MB is determined to be complex. Classifying H.264 MBs as either smooth or complex reduces or eliminates the need to determine each of the intra4 and intra16 cost values. In one embodiment, a mean absolute difference (MAD) of the H.264 MB pixel values is used to classify the H.264 MB as smooth or complex.

In one embodiment, an apparatus determines a threshold value based on a quantization parameter (QP) of an H.264 MB of image data. The QP regulates how much detail of an image is saved. When the QP is very small, almost all the detail is retained. As the QP is increased, some of the detail is aggregated so that a bit rate drops but at the price of some increase in distortion and some loss of quality. The apparatus is to calculate an image characteristic based on pixel values of the H.264 MB. The characteristic may be the MAD of the pixel values. The apparatus comprises a classification logic to assign a classification value to the H.264 MB based on comparing the threshold value to the image characteristic. The apparatus also comprises an encoding logic to selectively encode the H.264 MB based on the classification value. The encoding logic is to encode the H.264 MB based on an intra16 prediction mode upon determining the classification value is smooth. The encoding logic is to encode the H.264 MB based on an intra4 prediction mode upon determining the classification value is complex. The encoding logic is to encode the H.264 MB based on an intra16 prediction mode upon determining the classification value is smooth.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an (application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read.

"Logic", as used herein, includes but is not limited to hardware, firmware, software stored or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include at least one circuit, one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

FIG. 1A illustrates one embodiment of an apparatus 100 associated with encoding image data. The apparatus 100 classifies macro-blocks (MBs) as either smooth or complex. The MBs may be H.264 MBs. Of course, other types of macroblocks may be implemented. Smooth MBs have image data that is encoded better with an intra16 mode of encoding data rather than with an intra4 mode. Complex MBs have data that is best encoded with an intra4 mode of encoding. A full search of each cost value of the intra4 and intra16 modes of encoding is avoided because an MB is encoded based on whether the apparatus 100 determines the macro-block as smooth or complex. The present systems and methods may be implemented with other encoding modes for smooth and complex images.

Figure 2:
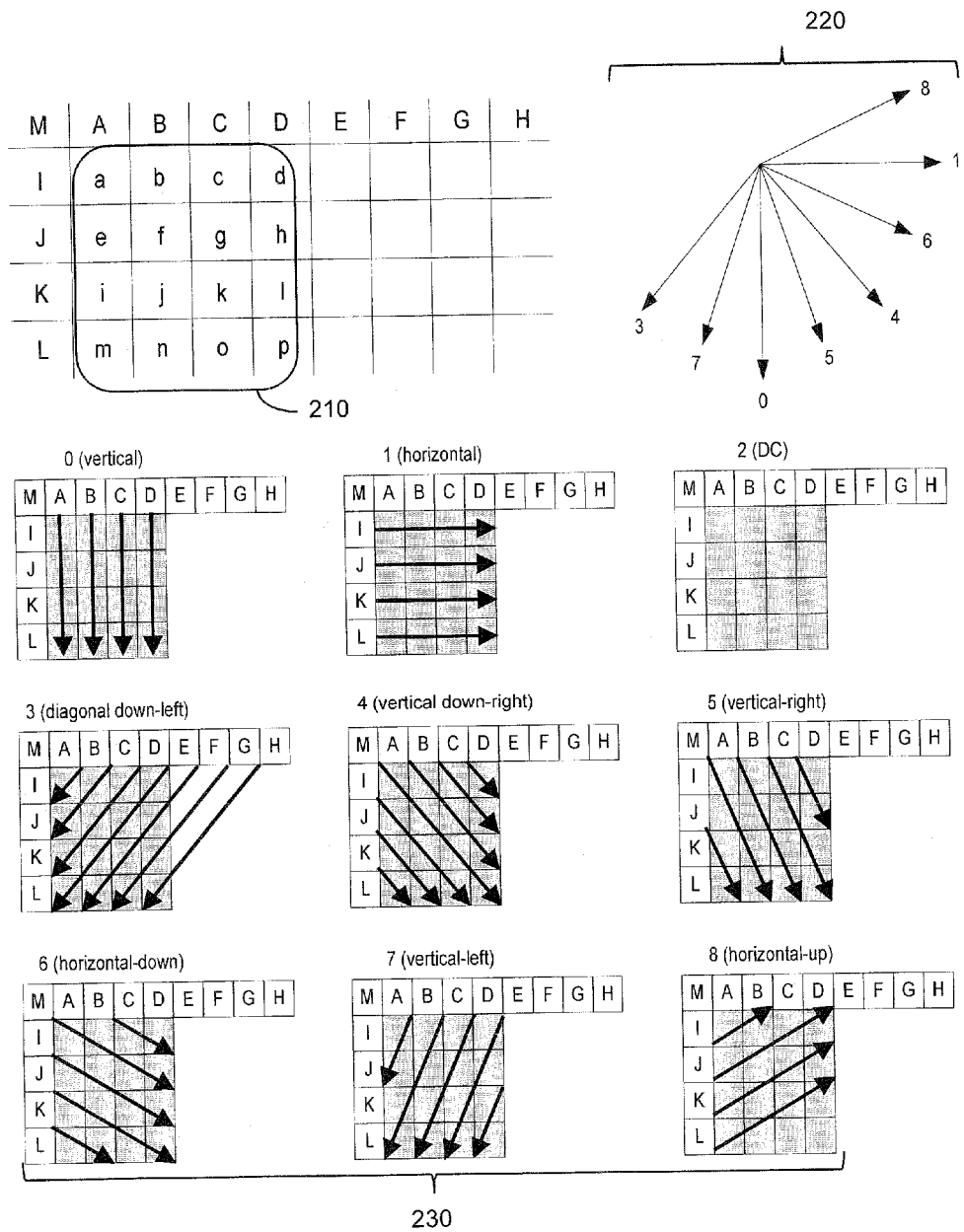
FIG. 2 illustrates one embodiment of an intra prediction operation associated with encoding image data.

A brief introduction as to how the intra4 and intra16 modes may be used to encode an image is now presented. The mathematical and other details might not be needed to understand some embodiments of encoding image data. Each pixel in a target MB may be predicted with pixels in adjacent MBs. Pixel data of the adjacent MBs is used to predict the pixels of the target MB. In FIG. 2, un-capitalized letters represent the pixels of a target MB 210 being encoded with an intra4 mode of encoding. Pixels in an adjacent block immediately above the target block are designated by capital alphabetic characters A through H. Pixels in an adjacent block immediately to the left of the target block are designated by capital alphabetical characters I thought L. The bottom right pixel in an adjacent block above and to the left of the target MB is designated by the capital letter "M".

Prediction modes may comprise instructions or algorithms for predicting specific pixels in a target block. In one embodiment, an intra4 mode of encoding data has nine intra modes. These modes may refer to one or more adjacent block pixels as described in the following mode descriptions. Of course, different modes of encoding can be used, and the intra4 and intra16 modes can change. Thus the present systems and methods can be implemented with other modes.

For example, as shown in FIG. 2, prediction mode 0 predicts pixels of the target MB 210 by projecting reference pixels vertically. Pixels "a, e, i, m" may be predicted by reference pixel A. Pixels "b, f, j, n" may be predicted by reference pixel B. Pixels "c, g, k, o" may be predicted by pixel reference pixel C. Pixels "d, j, l, p" may be predicted by reference pixel D.

Other reference pixel reference pixel modes may use vertical or diagonal techniques of predicting target MB pixels. For example, reference pixel mode 3 of FIG. 2 uses a diagonal down/left system of predicting pixels. The prediction for pixel "a" may be predicted by a computation involving pixels A, B, and C. Pixels "b" and "e" may be predicted by a computation involving pixels B, C, and D. Pixels "c", "f", and "l" may be predicted by a computation involving pixels C, D, and E. Pixels "d", "g", "j", and "m" may be predicted by a computation involving pixels D, E, and F. Pixels "h", "k", and "n" may be predicted by a computation involving pixels E, F, and G. Pixels l and o may be predicted by a computation involving pixels F, G, and H. Pixel "p" may be predicted by pixels G, and H.

The prediction modes may also be thought of as prediction directions 220. There are nine different prediction directions 220 for intra4 coding. FIG. 2 shows generally how each of the prediction directions 220 relates to the nine prediction modes 230 for intra4 coding. The nine prediction modes 230 may be labeled as vertical (0), horizontal (1), DC (mode 2), diagonal down/left (3), diagonal down/right (4), vertical-right (5), horizontal-down (6), vertical-left (7), and horizontal-up (8). DC prediction averages all the neighboring pixels together to predict a particular pixel value.

Figure 3:
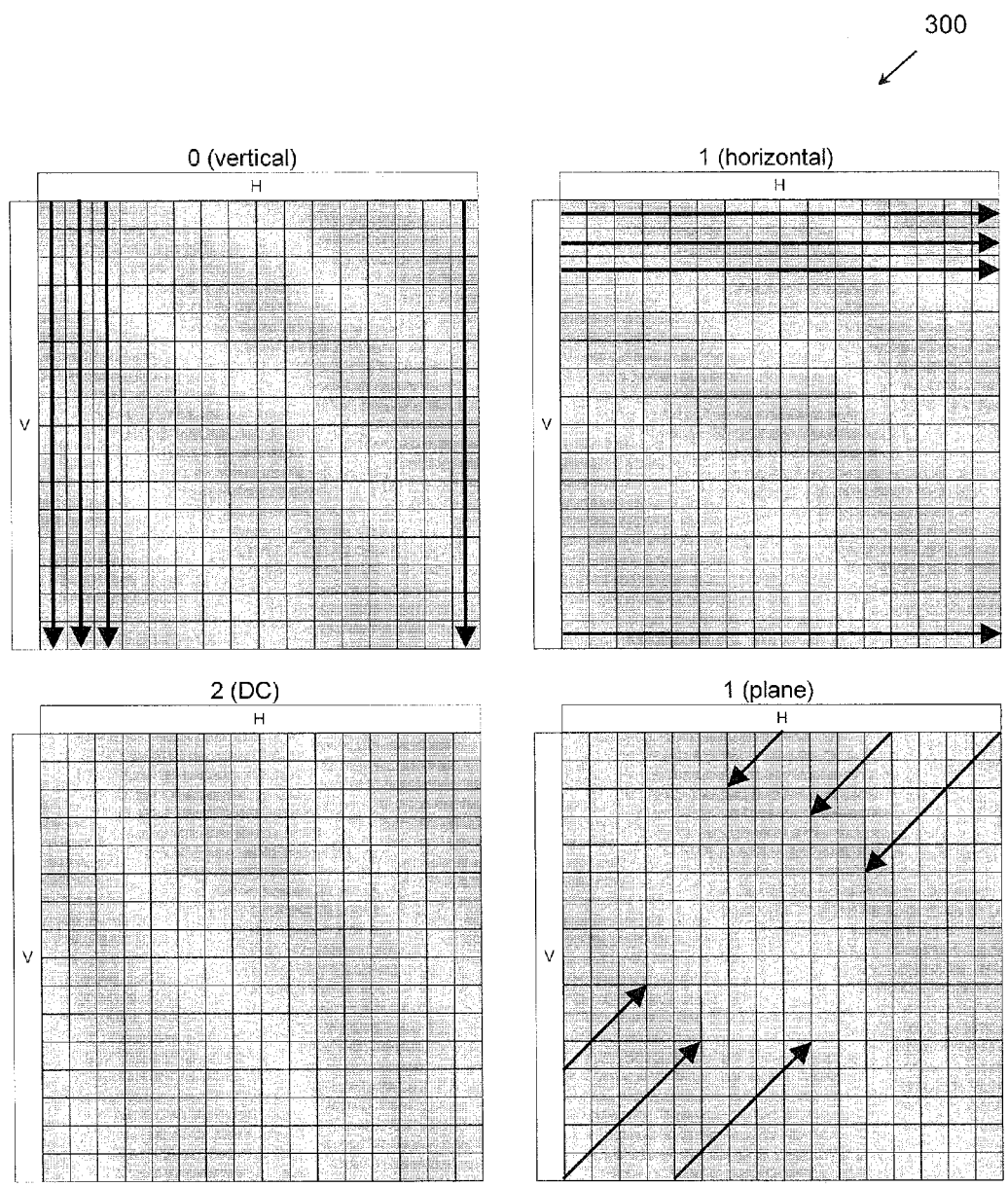
FIG. 3 illustrates another embodiment of an intra prediction operation associated with encoding image data.

For intra16 there are four different prediction modes. The four intra16 predictions modes are vertical (0), horizontal (1), DC (2), and plane (3). FIG. 3 shows generally how the intra16 prediction modes map to a MB. The four intra prediction modes all predict a MB based on adjacent pixel values. The mathematical details of how a prediction mode is calculated are not explained in any further detail here, but is well known to one skilled in the art.

In one embodiment, the apparatus 100 of FIG. 1 comprises a threshold logic 110 to determine a threshold value. The threshold value may be based on a quantization parameter (QP) of an H.264 MB of image data. The QP may be a quantization parameter defined in the H.264 standard. The QP may be based on a bit rate of the image data.

In one embodiment, an H.264 compliant codec (coder/decoder) may use a QP to adjust the overall bit rate to achieve a target rate. The smaller the QP, the greater the amount of information conveyed in the encoded bit stream and the higher the corresponding bit rate. The larger the QP, the smaller the amount of information conveyed in a bit stream. Furthermore, the larger the QP, the poorer the quality of the decoded or reproduced video pictures. In some embodiments, the choice of a QP of a particular picture is related to, among other things, the complexity of the video picture, the degree of change between adjacent pictures, and the target bit rate.

With reference again to FIG. 1A, the apparatus 100 comprises a classification logic 130 configure to determine, using an image characteristic from a macro-block of image data, whether the macro-block is a smooth image or a complex image based at least in part on the image characteristic. Encoding logic 140 is configured to generate an encoded macro-block by selectively encoding the macro-block using a first prediction mode if the macro-block is the smooth image and encoding the macro-block using a different second prediction mode if the macro-block is the complex image.

Figure 1B:
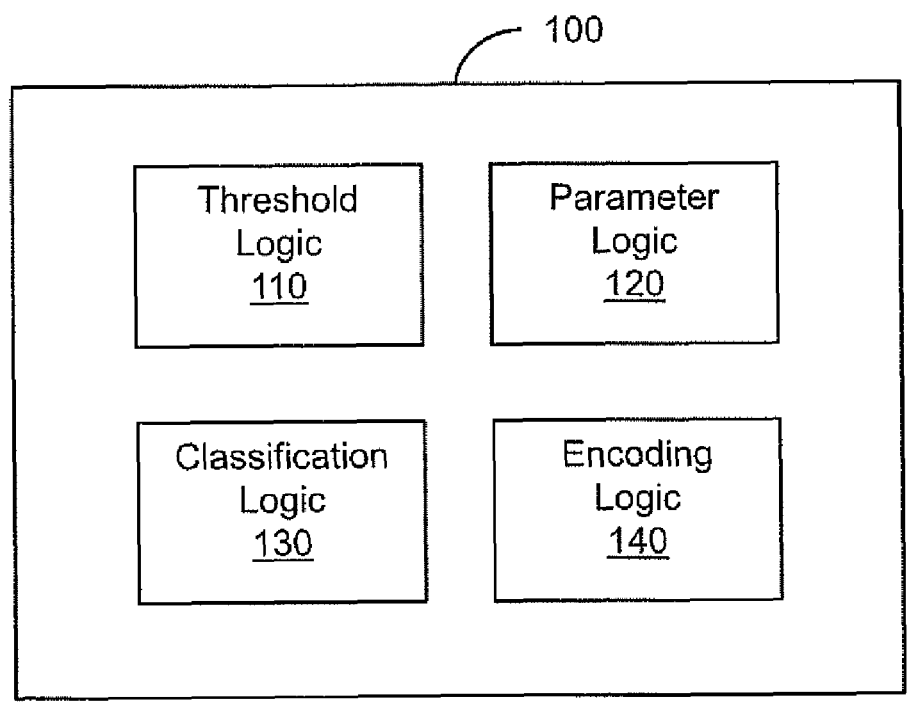
FIG. 1B illustrates another embodiment of an apparatus associated with encoding image data.

FIG. 1B illustrates another embodiment of apparatus 100. The apparatus 100 comprises parameter logic 120 to calculate an image characteristic based on pixel values of the MB. The parameter logic 120 may determine the image characteristic by calculating a mean absolute difference (MAD) of the MB pixel values. In another example, the parameter logic 120 may determine the characteristic to be a sum of absolute differences (SAD) of the MB pixel values. In another embodiment, the parameter logic 120 may determine the characteristic with a function that may be programmable. Those of ordinary skill in the art will understand that parameter logic 120 may determine other characteristics to be used to classify the MB.

In another embodiment, the classification logic 130 is configured to assign a classification value to the MB. The classification is assigned based on comparing the threshold value to the image characteristic. The classification logic 130 is to assign the classification value of smooth when the image characteristic is below or equal to the threshold value.

The apparatus 100 comprises an encoding logic 140 to selectively encode the MB. The encoding may be based on the classification value. The encoding logic 140 is to encode the MB based on an intra16 prediction mode upon determining the classification value is smooth. The encoding logic 140 is to encode the MB based on an intra4 prediction mode upon determining the classification value is complex.

In one embodiment, the apparatus 100 is located in a chip. A chip is at least one integrated circuit fabricated on a semiconductor material.

In one embodiment, the threshold logic 110 is to determine a smooth threshold and a complex threshold of a macro-block (MB) (e.g. an H.264 MB) of image data. The parameter logic 120 is to calculate an image characteristic and the classification logic 130 is to assign a classification value to the MB. The classification value may be determined by comparing the image characteristic to the smooth threshold and the complex threshold. The encoding logic 140 is to selectively encode the MB based on the classification value. The encoding logic 140 is to encode the MB based on an intra16 prediction mode upon determining the classification value is smooth. The encoding logic 140 is to encode the MB based on an intra4 prediction mode upon determining the classification value is complex.

In another embodiment, the encoding logic 140 may compare the classification value to a medium threshold value when the MB is between the smooth threshold and the complex threshold. The encoding logic 140 may, upon determining the classification value is medium, perform three actions. First, the encoding logic 140 is to determine the medium threshold of the MB. Second, the encoding logic 140 is to perform an intra16 search of the MB to determine a cost value. Third, the encoding logic 140 is to encode the MB based on an intra16 prediction mode upon determining the cost value is below or equal to the medium threshold. The encoding logic 140 encodes the MB based at least on an intra4 prediction mode when the cost value is above the medium threshold. One of ordinary skill in the art will understand that these actions may be performed in different orders and in different combinations than those listed here.

In one embodiment, the threshold logic 110 is to determine the smooth threshold and the complex threshold to correspond to the values of Table 1:

TABLE 1

| QP | Smooth Threshold | Complex Threshold |
|---|---|---|
| 1 to 16 | 0 | 1 |
| 17 to 21 | 1 | 2 |
| 22 to 25 | 1 | 5 |
| 26 to 29 | 2 | 6 |
| 30 to 33 | 3 | 6 |
| 34 to 37 | 4 | 15 |
| 38 to 39 | 5 | 40 |
| 40 to 41 | 6 | 40 |
| 42 to 46 | 7 | 80 |
| 47 to 52 | 7 | 10 |

In another embodiment, the encoding logic 140 is to determine the medium threshold to correspond to the values of Table 2:

TABLE 2

| QP | Medium Threshold |
|---|---|
| 1 to 22 | 22 |
| 23 | 23 |
| 24 | 27 |
| 25 | 28 |
| 26 | 32 |
| 27 | 36 |
| 28 | 41 |
| 29 | 42 |
| 30 | 53 |
| 31 | 58 |
| 32 | 63 |
| 33 | 67 |
| 34 | 76 |
| 35 | 86 |
| 36 | 91 |
| 37 | 99 |
| 38 | 110 |
| 39 | 123 |
| 40 | 139 |
| 41 | 148 |
| 42 | 170 |
| 43 | 186 |
| 44 | 208 |
| 45 | 227 |
| 46 | 242 |
| 47 | 253 |
| 48 to 52 | 254 |

In one embodiment, the classification logic 130 is to assign the classification value of smooth when the image characteristic is below or equal to the smooth threshold. The classification logic 130 is to assign the classification value of medium when the image characteristic is above the smooth threshold and the image characteristic is below the complex threshold. The classification logic 130 is to assign the classification value of complex when the image characteristic is above or equal to the complex threshold. In another embodiment, the encoding logic 140 is to encode the MB based on an intra4 prediction mode upon determining the cost value is above to the medium threshold and the cost of intro is less than that of intra16.

In one embodiment, when the QP is 32 the apparatus 100 encodes the H.264 MB with a speed performance improvement. The performance improvement is based on comparing the apparatus 100 to a different device that fully searches each intra4 protection mode and each intra16 prediction mode. The performance of the apparatus 100 is improved because the apparatus 100 classifies the H.264 MB based on threshold values without searching each intra4 and intra16 prediction mode.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
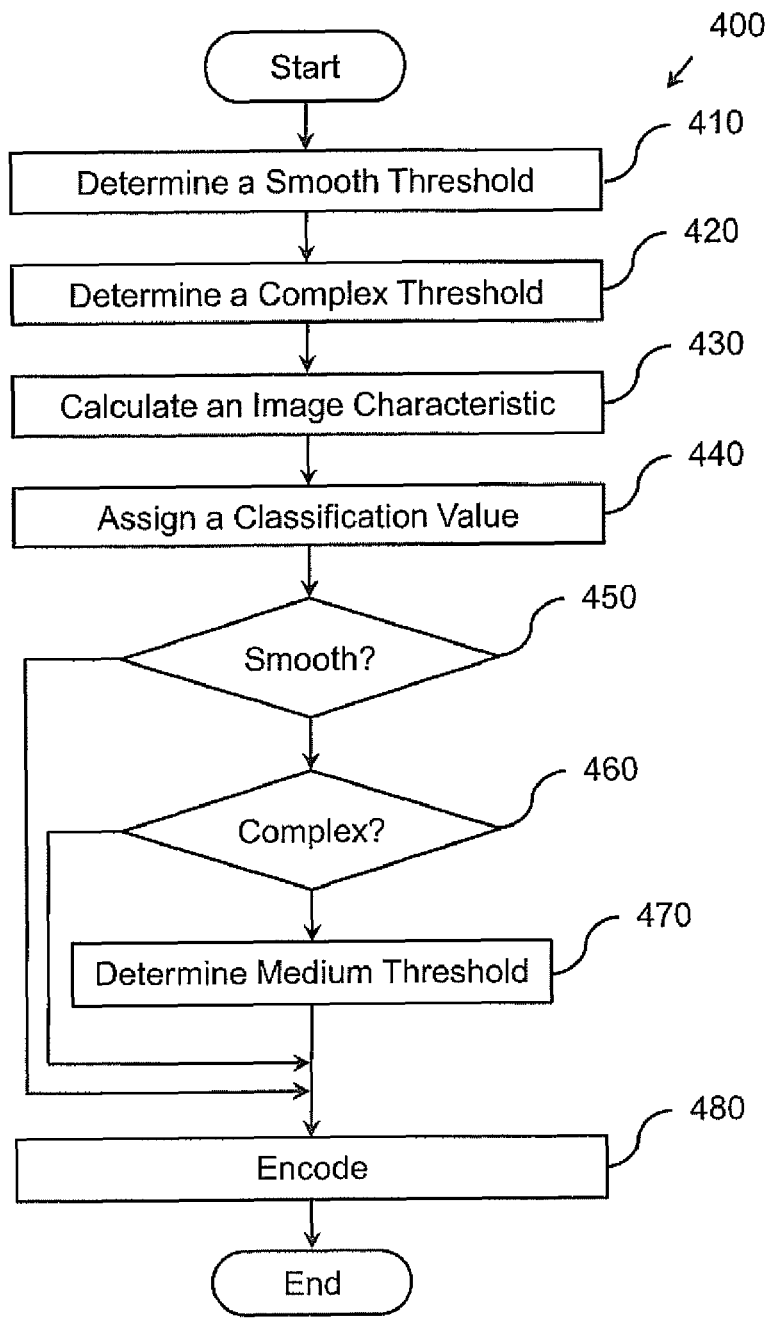
FIG. 4 illustrates one embodiment of a method associated with encoding image data.

FIG. 4 illustrates an example method 400 associated with device encoding image data. The method 400 may perform some of the operations the apparatus 100 (FIG. 1) is to perform. The method 400 improves the speed of encoding image data by classifying image data to be encoded as smooth or complex imaged data. The method 400 determines, at 410, a smooth threshold of an MB (e.g., H.264 MB) of image data. A complex threshold of the H.264 macroblock is determined at 420. The smooth and complex threshold may be determined, at 410 and 420, by looking the thresholds up in a table based, at least in part, on a quantization parameter associated with the MB. An H.264 MB of image data below the smooth threshold may have pixel data that does not change significantly between adjacent pixel values. For example, image data for a cloud may be below the smooth threshold. An H.264 MB with of image data above the complex threshold may have pixel data that changes significantly between adjacent pixel values. For example, image data for an iris of an eye may be above the complex threshold.

The method 400, at 430, calculates an image characteristic based on pixel values of the MB. In one embodiment, the image characteristic is determined by calculating a mean absolute difference (MAD) of the MB pixel values. The method 400 assigns a classification value, at 440, to the MB. The classification value is determined by comparing the image characteristic to the smooth threshold and the complex threshold. In some embodiments, the method 400 assigns the classification value of smooth when the image characteristic is below or equal to the smooth threshold and assigns a classification value of complex when the image characteristic is above or equal to the complex threshold. The method 400 assigns the classification value of medium when the image characteristic is above the smooth threshold and the image characteristic is below the complex threshold.

The MB is selectively encoded at 480. The encoding is based on the classification value. Upon determining, at 450, the classification value is smooth, the MB is encoded, at 480, based on an intra16 prediction mode. Upon determining, at 460, the classification value is complex, the MB is encoded based on an intra4 prediction mode.

The encoding at 480 may involve determining a cost value when the classification value is between the smooth and complex thresholds (e.g., medium). Upon determining the classification value is medium because the classification value is between the smooth and complex thresholds, the method 400 may perform three actions, in one embodiment. First, the method 400 determines, at 470, a medium threshold of the MB. As discussed below, the medium threshold may be determined by looking the threshold up in a table based, at least in part, on the quantization parameter associated with the MB. Second, the method 400 performs an intra16 search of the MB to determine a cost value. Third, the method 400 encodes, at 480, the MB based on an intra16 prediction mode upon determining the cost value is below or equal to the medium threshold. In one embodiment, the method 400 comprises upon determining the cost value is above the medium threshold and the cost value of intra4 is less than that of intra16, encoding, at 480, the MB based on an intra4 prediction mode. One of ordinary skill in the art will understand that these actions may be performed in different orders and in different combinations than those listed here.

In one embodiment, the smooth threshold, the medium threshold, and the complex threshold are determined based on a quantization parameter (QP) of the MB. In one embodiment, the smooth threshold and the complex thresholds are determined to be values according to Table 1 listed above. In another embodiment, the medium threshold is determined to be values according to Table 2 listed above. In one embodiment, the QP is based on a bit rate of the image data. In one embodiment, the method 400 is performed in a chip.

Figure 5:
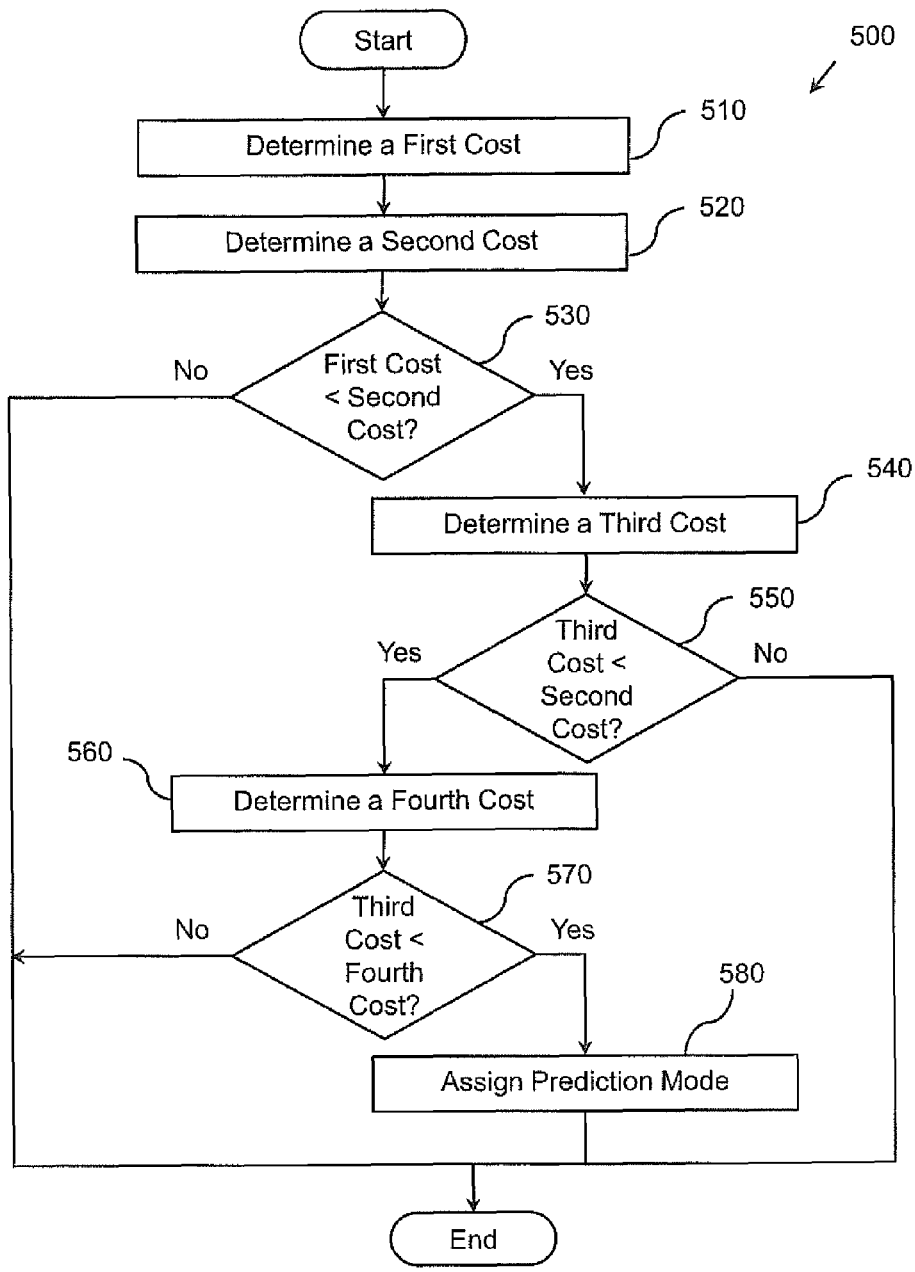
FIG. 5 illustrates another embodiment of a method associated with encoding image data.

FIG. 5 illustrates an example method 500 associated with encoding image data. The method 500 involves a faster way to determine the lowest cost mode of the intra4 modes of encoding image data. Traditionally, to find the intra4 mode, a cost value of each of the intra4 modes of encoding data was calculated. The mode with the lowest cost was then selected to encode the image data.

Figure 6:
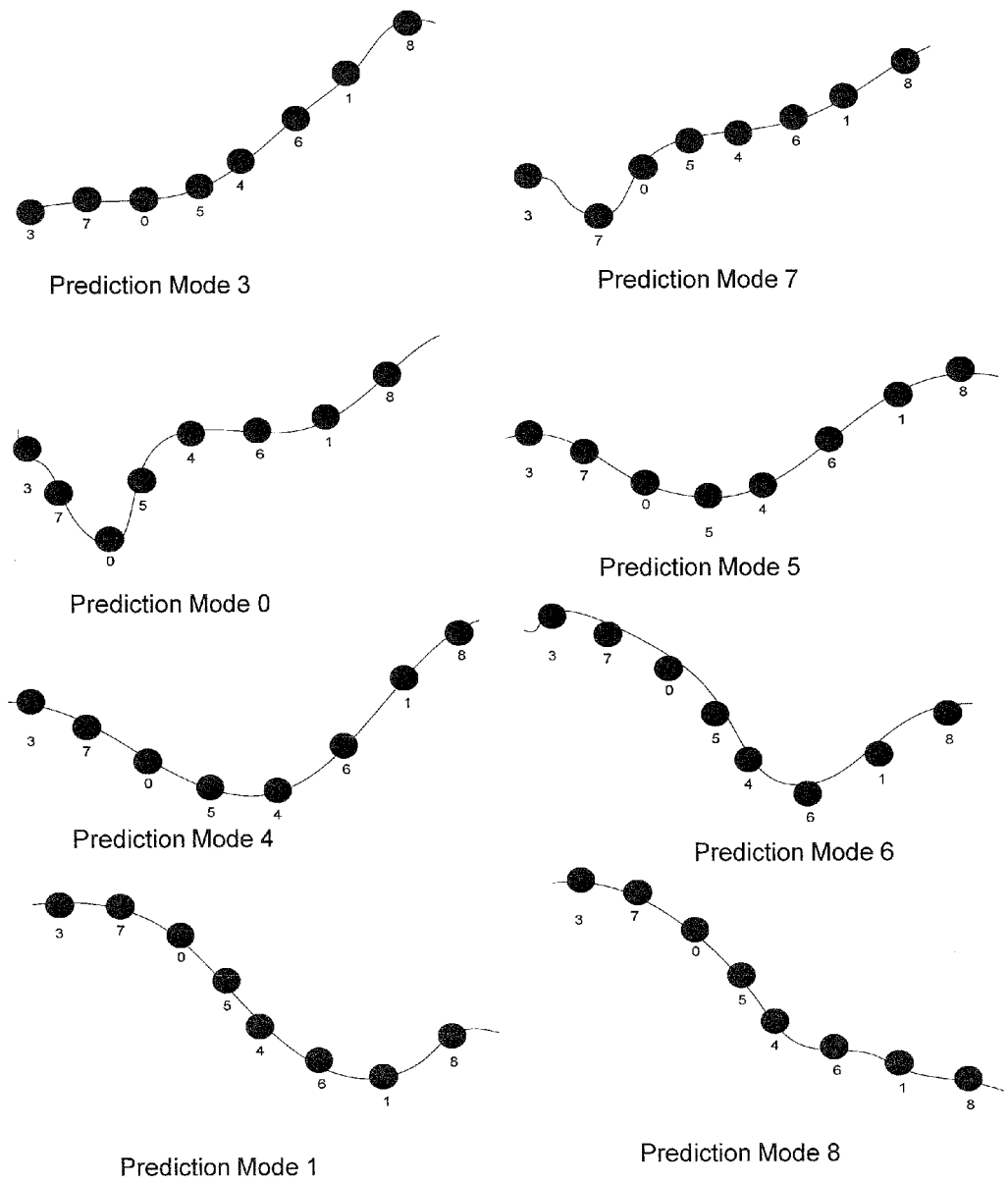
FIG. 6 illustrates graphs of intra prediction mode cost values associated with encoding image data.

When the prediction directions 220 of FIG. 2 are read counter-clock wise the directions begin with intra4 mode 3, and then follow the sequence, intra4 mode 7, intra4 mode 0, intra4 mode 5, intra4 mode 4, intra4 mode 6, intra4 mode 1, and intra4 mode 8. The cost values for each intra4 mode may be graphed in this order as shown in FIG. 6. The graphs represent cost value vs. intra4 mode. Eight separate graphs are shown in FIG. 6. Each graph represents a different one of the eight intra4 modes having the lowest cost.

Graphing the cost values of the intra4 modes results in a graph that is at least partially monotonic. Notice that each graph in FIG. 6 has 1 lowest point. On each side of a lowest point, the cost values are increasing. The cost values are greater the further away from the lowest point that a cost value is located.

A search for the lowest cost value may involve comparing the cost value for two intra4 modes that are separated by other intra4 modes. For example, the cost values for intra4 mode 0 and intra4 mode 1 may be compared. Intra4 mode 0 and 1 may be considered to be separated by three other intra4 modes because, as shown in FIG. 6, intra4 modes 5, 4, and 6 are in between intra4 modes 0 and 1. Next, the cost for intra4 mode 5 is compared to the cost value of intra4 mode 0 when the cost of intra4 mode 0 is less than the cost of intra4 mode 1. Next, the cost for intra4 mode 5 is compared to the cost value of intra4 mode 4 when the cost of intra4 mode 5 is less than the cost of intra4 mode 0. Next, the cost for intra4 mode 6 is compared to the cost value of intra4 mode 4 when the cost of intra4 mode 4 is less than the cost of intra4 mode 5. If the cost of intra4 mode 4 is less than the cost of intra4 mode 6 and the cost of intra4 mode 2, then intra4 mode 4 has the lowest cost. By zeroing in on the intra4 mode with the lowest cost, the cost values for intra4 modes 3, 7, and 8 did not need to be determined in order to find the low cost intra4 mode. One of ordinary skill in the art will understand that these actions may be performed in different orders and in different combinations than those listed here.

The method 500 of FIG. 5 may find the low cost intra4 mode of encoding image data using a similar procedure. The method 500 begins by determining, at 510, a first cost and determining, at 520, a second cost. The first cost and second cost are based on an H.264 intra4 first prediction mode and a second prediction mode, respectively. The first and second prediction modes are associated with a macroblock (MB) of image data that may be an H.264 MB.

The method 500 determines whether the first cost is less than the second cost at 530. Upon determining the first cost is less than the second cost, the method 500 determines, at 540, a third cost based on an H.264 intra4 third prediction mode of the MB. A determination is made at 550 to determine whether the third cost is less than the second cost. Upon determining the third cost is less than the first cost, a fourth cost based on an H.264 intra4 fourth prediction mode of the MB is determined at 560. The method 500 determines, at 570, whether the third cost is less than or equal to the fourth cost. The third prediction mode is assigned, at 580, to the MB when the third cost is less than the fourth cost.

In one embodiment, the method 500 comprises determining if the fourth cost is less than the third cost. The method 500 determines a fifth cost based on an H.264 intra4 fifth prediction mode of the MB, when the fourth cost is less than the third cost. Upon determining the fifth cost is less than or equal to the fourth cost, the method 500 assigns the fifth prediction mode to the MB. Upon determining the fourth cost is less than the fifth cost, the method 500 assigns the fourth prediction mode to the MB.

In one embodiment, the method 500 comprises determining a mode 2 cost based on H.264 intra4 prediction mode 2 of the MB. Upon determining the mode 2 cost is less than the third cost and upon determining the mode 2 cost is less than the fourth cost, the method 500 re-assigns prediction mode 2 to the MB. In another embodiment, the method 500 determines a low cost H.264 intra4 prediction mode at least 10 percent faster than when each intra4 prediction mode is searched.

Figure 7:
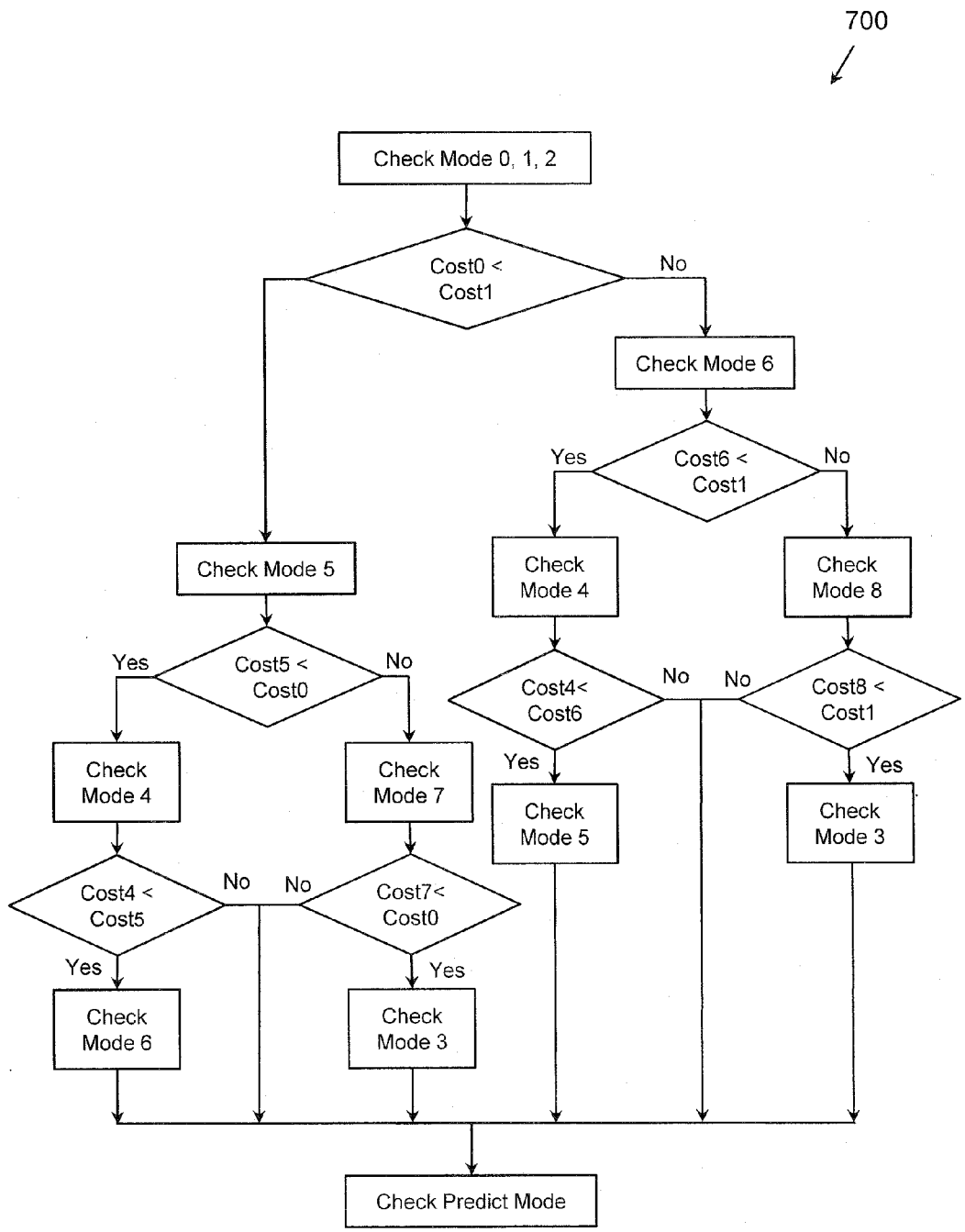
FIG. 7 illustrates another embodiment of a method associated with encoding image data.

FIG. 7 illustrates another example method 700 associated with encoding image data. The method 700 involves determining the lowest cost mode of the intra4 modes of encoding image data without calculating nine cost values. After performing a sequence of comparisons, a reduced number of prediction modes are checked to determine the best matching mode for a MB. The reduced number of prediction modes is based, at least in part, on the sequence of comparisons. The reduced number of prediction modes may be checked to find the lowest cost prediction mode of the reduced number of prediction modes.

It will be appreciated that in one embodiment, the methods herein may be implemented as computer executable instructions embodied and stored on a computer-readable medium. When executed by a machine (e.g., processor, device) the instructions cause the machine to perform the methods herein and their equivalents. The methods can also be implemented with circuits or a combination of hardware and software.

Figure 8:
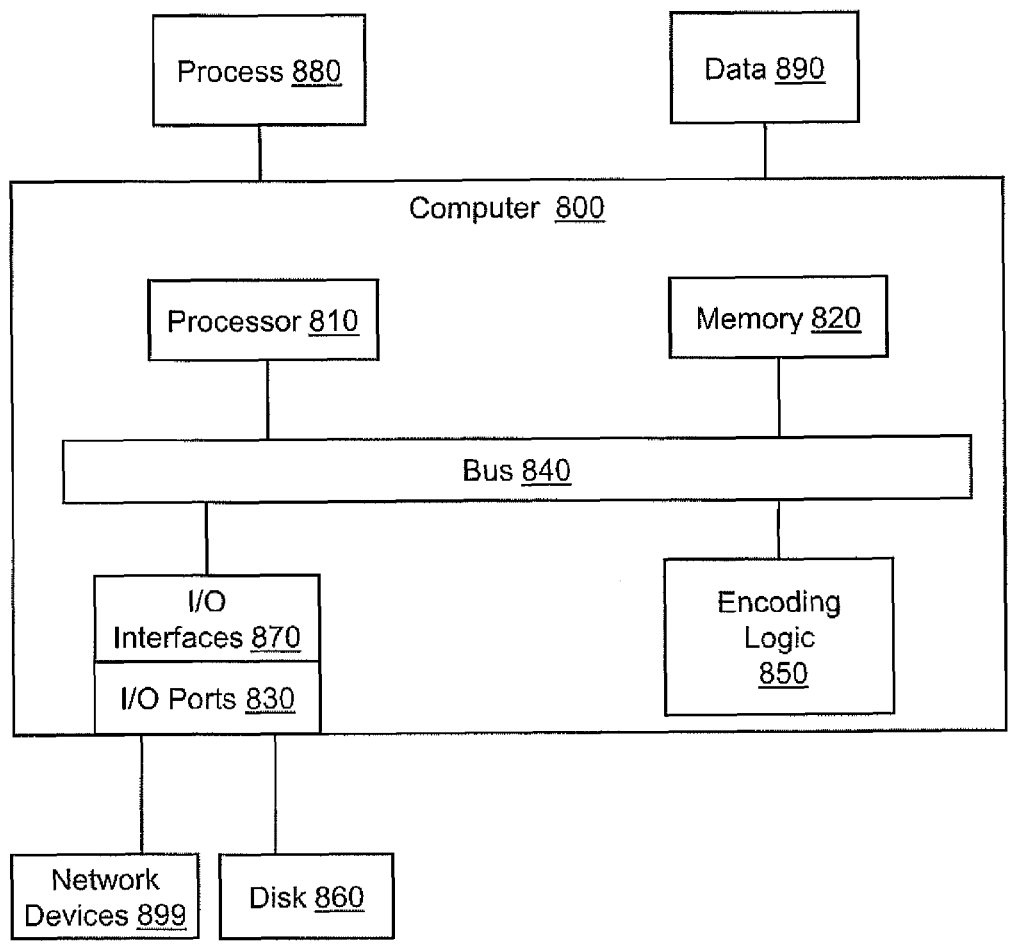
FIG. 8 illustrates an embodiment of a computing environment in which example systems and methods, and equivalents associated with encoding image data may be implemented.

FIG. 8 illustrates an example computing device in which example systems and methods described herein, and equivalents, may be implemented. The example computing device may be a computer 800 that includes a processor 810, a memory 820, and input/output ports 830 operably connected by a bus 840. In one example, the computer 800 may include an encoding logic 850 to encode image data.

The encoding logic 850 provides means (e.g., hardware, stored software, and firmware) for device configuration. The encoding logic 850 can be implemented similar to the apparatus 100, and/or combinations of their features. The encoding logic 850 can include logic implemented, for example, as an ASIC or other type of circuit.

Generally describing an example configuration of the computer 800, the processor 810 may be a variety of various processors including dual microprocessor and other multi-processor architectures. A memory 820 may include volatile memory and/or non-volatile memory. Non-volatile memory may include, for example, read-only memory (ROM), programmable read only memory (PROM), erasable programmable read only memory (EPROM), electronically erasable programmable read only memory (EEPROM), and so on. Volatile memory may include, for example, random access memory (RAM), static random access memory (SRAM), dynamic random access memory (DRAM), and so on.

A disk 860 may be operably connected to the computer 800 via, for example, through an input/output interface (e.g., card, device) 870 and the input/output port 830. The disk 860 may be, for example, a magnetic disk drive, a solid state disk drive, a floppy disk drive, a tape drive, a Zip drive, a flash memory card, a memory stick, and so on. Furthermore, the disk 860 may be a compact disk read-only memory (CD-ROM) drive, a compact disk recordable (CD-R) drive, a compact disk rewritable (CD-RW) drive, a digital video disk read-only memory (DVD ROM), and so on. The memory 820 can store a process 880 and/or a data 890, for example. The disk 860 and/or the memory 820 can store an operating system that controls and allocates resources of the computer 800.

The bus 840 may be a single internal bus interconnect architecture and/or other bus or mesh architectures. While a single bus is illustrated, it is to be appreciated that the computer 800 may communicate with various devices, logics, and peripherals using other busses (e.g., peripheral component interconnect express (PCIE), 1394, universal serial bus (USB), Ethernet). The bus 840 can be types including, for example, a memory bus, a memory controller, a peripheral bus, an external bus, a crossbar switch, and/or a local bus.

The computer 800 may interact with input/output devices via the input/output (I/O) interfaces 870 including the encoding logic 850 and the input/output ports 830. Input/output devices may be, for example, a keyboard, a microphone, a pointing and selection device, cameras, video cards, displays, the disk 860, the network devices 899, and so on. The input/output ports 830 may include, for example, serial ports, parallel ports, and USB ports.

The computer 800 can operate in a network environment and thus may be connected to the network devices 899 via the I/O interfaces 870, and/or the I/O ports 830. Through the network devices 899, the computer 800 may interact with a network. Through the network, the computer 800 may be logically connected to remote computers. Networks with which the computer 800 may interact include, but are not limited to, a local area network (LAN), a wide local area network (WLAN), a wide area network (WAN), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
   classification logic configured to determine, using an image characteristic from a macro-block of image data, whether the macro-block is a smooth image, a medium image, or a complex image based at least in part on the image characteristic;
   wherein a smooth threshold value and a complex threshold value are generated to define values of the image characteristic to determine the smooth image and the complex image, and wherein the medium image is determined for values between the smooth threshold value and the complex threshold value;
   encoding logic configured to generate an encoded macro-block by selectively encoding the macro-block using an intra16 prediction mode if the macro-block is the smooth image and encoding the macro-block using an intra4 prediction mode if the macro-block is the complex image; and
   when the macro-block is the medium image, the encoding logic is configured to:
      for a plurality of intra16 prediction modes, calculate a cost for each mode for encoding the macro-block and select the intra16 prediction mode having a minimum cost;
      if the minimum cost is less than a medium cost threshold, then encode the macro-block with the intra16 prediction mode having the minimum cost; and
      if the minimum cost is greater than the medium cost threshold, then encode the macro-block with a selected intra4 prediction mode.

2. The apparatus of claim 1, further including:
   threshold logic to determine the smooth threshold value and the complex threshold value;
   parameter logic to calculate the image characteristic based on pixel values the macro-block of image data;
   where the classification logic is configured to assign a classification value to the macro-block based on comparing the smooth threshold value and the complex threshold value to the image characteristic.

3. The apparatus of claim 2, where the parameter logic is to determine the image characteristic by calculating a mean absolute difference (MAD) of the macro-block pixel values.

4. The apparatus of claim 1, where the smooth threshold value and the complex threshold value are based on a quantization parameter (QP) of the macro-block of image data, where the QP is based on a bit rate of the image data.

5. The apparatus of claim 1, where the threshold value is based on a quantization parameter (QP) of the macro-block of image data.

6. The apparatus of claim 1, where the smooth threshold value, and the complex threshold value are based on a quantization parameter (QP) of the macro-block.

7. The apparatus of claim 6, where the quantization parameter is based on a bit rate of the image data.

8. The apparatus of claim 1, further comprising classification logic configured to: assign a classification value of smooth when the image characteristic is below or equal to the smooth threshold value, assign the classification value of medium when the image characteristic is between the smooth threshold value and the complex threshold value, and assign the classification value of complex when the image characteristic is above or equal to the complex threshold value.

9. The apparatus of claim 1, where the apparatus is implemented in a television.

10. A method, comprising:
calculating an image characteristic value based on pixel values of a macro-block of image data;
assigning a classification value to the macro-block, the classification value being based on the image characteristic value, wherein the classification value identifies the macro-block as being smooth, medium, or complex;
wherein the classification value is determined by comparing the image characteristic value to a smooth threshold value and a complex threshold value, and wherein the classification value is assigned as medium when the image characteristic value is between the smooth threshold value and the complex threshold value;
selectively encoding the macro-block based on the classification value, where upon determining the classification value is smooth, the macro-block is encoded based on an intra16 prediction mode, where upon determining the classification value is complex, the macro-block is encoded based on an intra4 prediction mode; and
wherein when the classification value is medium:
calculating, for a plurality of intra16 prediction modes, a cost for each mode for encoding the macro-block and selecting the intra16 prediction mode having a minimum cost;
if the minimum cost is less than a medium cost threshold, then encoding the macro-block with the intra16 prediction mode having the minimum cost; and
if the minimum cost is greater than the medium cost threshold, then encoding the macro-block with a selected intra4 prediction mode.

11. The method of claim 10, where the smooth threshold value, and the complex threshold value are pre-determined based on quantization parameters (QP) from image data.

12. The method of claim 11, where the quantization parameters are based on a bit rate of the image data.

13. The method of claim 10, wherein the assigning comprises assigning the classification value of smooth when the image characteristic is below or equal to the smooth threshold value, assigning the classification value of medium when the image characteristic is above the smooth threshold value and the image characteristic is below the complex threshold value, and assigning the classification value of complex when the image characteristic is above or equal to the complex threshold value.

14. The method of claim 10, wherein the image characteristic is determined by calculating a mean absolute difference (MAD) of the macro-block pixel values.

15. A semiconductor chip, comprising:
at least one integrated circuit configured to:
calculate an image characteristic value based on pixel values of a macro-block of image data;
assign a classification value to the macro-block, the classification value being based on the image characteristic value, wherein the classification value identifies the macro-block as being smooth, medium, or complex;
wherein the classification value is determined by comparing the image characteristic value to a smooth threshold value and a complex threshold value, and wherein the classification value is assigned as medium when the image characteristic value is between the smooth threshold value and the complex threshold value;
selectively encode the macro-block based on the classification value, wherein upon determining the classification value is smooth, the macro-block is encoded based on an intra16 prediction mode, wherein upon determining the classification value is complex, the macro-block is encoded based on an intra4 different second prediction mode; and
wherein when the classification value is medium, the at least one integrated circuit is configured to:
calculate, for a plurality of intra16 prediction modes, a cost for each mode for encoding the macro-block and select the intra16 prediction mode having a minimum cost;
if the minimum cost is less than a medium cost threshold, then encode the macro-block with the intra16 prediction mode having the minimum cost; and
if the minimum cost is greater than the medium cost threshold, then encode the macro-block with a selected intra4 prediction mode.

16. The semiconductor chip of claim 15, wherein the at least one integrated circuit includes logic configured to determine the smooth threshold value, and the complex threshold value based at least in part on a quantization parameter (QP) of image data.

17. The semiconductor chip of claim 16, wherein the at least one integrated circuit includes logic configured to determine the quantization parameter (QP) of the image data based at least in part on a bit rate of the image data.

* * * * *